T. T. SABROE.
APPARATUS FOR THE PNEUMATIC CONTROL OF MILKING PULSATORS.
APPLICATION FILED DEC. 22, 1910.

1,070,740.

Patented Aug. 19, 1913.

UNITED STATES PATENT OFFICE.

THOMAS THOMASSEN SABROE, OF COPENHAGEN, DENMARK.

APPARATUS FOR THE PNEUMATIC CONTROL OF MILKING-PULSATORS.

1,070,740.  Specification of Letters Patent.  Patented Aug. 19, 1913.

Application filed December 22, 1910. Serial No. 598,850.

*To all whom it may concern:*

Be it known that I, THOMAS THOMASSEN SABROE, a citizen of the Kingdom of Denmark, residing in Copenhagen, in said Kingdom, have invented certain new and useful Improvements in Apparatus for the Pneumatic Control of Milking-Pulsators, of which the following is a specification.

The controlling of the valves in milking-pulsators is generally effected by means of a diaphragm, a piston or the like alternately subjected to two different pressures, for instance vacuum and air-pressure. The intermittent production of these two pressures has hitherto been obtained by means of a slide which during one period, for example, breaks off the vacuum-connection with the working-chamber and at the same time opens, for example, the air-connection, while it during the other period opens for the vacuum-connection and breaks off the air-connection.

The improved construction consists of a pneumatically-controlled milking-pulsator which comprises a working-chamber, a diaphragm in said working-chamber, said diaphragm being connected with the controlling device of the teat-cups, pipes connecting the working-chamber with the suction and atmosphere respectively for giving access of two different pneumatic working-pressures to the working-chamber, and a controlling device by which one of said pipe-connections is regulated and the access of the pneumatic pressure-medium therein to the working-chamber alternately interrupted, while the access of the other pressure-medium is always left uninterrupted.

Figure 1:
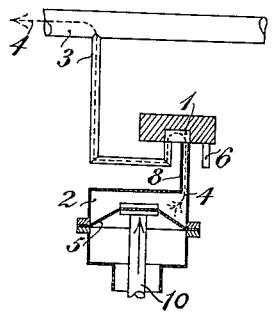
Figure 2:
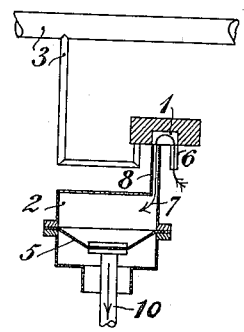

In the following reference will be made to the accompanying drawing where:

Figures 1 and 2 show the above mentioned hitherto known controlling-arrangement, and Figs. 3–6 are constructional forms of my improved controlling-arrangement.

Similar letters of reference indicate the same parts in the different figures of the drawing.

By the hitherto known controlling-arrangement the working chamber 2 is during the one period, Fig. 1, for instance, connected with the suction-pipe 3 through the chamber 1 of the slide. The working-chamber is therefore evacuated in the direction of the dotted arrow 4, and the diaphragm 5 is raised. During the other period, Fig. 2, the suction-pipe 3 is shut off, and the chamber 1 is at the same time connected with the air-opening 6 which was closed during the first period. The working-chamber is consequently filled with air which is drawn in in the direction of the fully drawn arrow 7, and the diaphragm is lowered. The diaphragm 5 is connected in the usual manner by a rod 10 with the controlling-device of the teat-cups. Although this controlling arrangement, theoretically considered, is correctly constructed, it has however, in practical use several drawbacks, which are due to the slide which is obliquely actuated, owing to the simultaneous presence of the two pressures. When, as will be the case frequently in practice, as working-agent during one period air of ordinary pressure, and during the other period, air of a lower pressure (vacuum), is used, the aforesaid uneven pressure on the valve and the consequent wear and leaking of the same is objectionable, as the power present during the one period is gradually decreased, so that the working of the pulsator is ultimately completely interrupted. Further, by this known controlling-arrangement the rather important mutual regulation of the speed of the working-member or the pulsating-valve in the one direction and in the other by mutual regulation of the two working-agents, that is to say by an increase of the suction-effect in the working-chamber during a simultaneous decrease of the pressure-effect, or vice versa, can either not be obtained at all or only by rather complicated means. At any rate, it cannot be obtained by merely decreasing or increasing the diameter of a single opening or duct. In the arrangement known, Figs. 1 and 2, there is one connection common for both working-agents, the duct 8, through which the air, as indicated by arrows, alternately passes in the one direction or in the other. By decreasing or widening the opening of this duct both periods are prolonged or shortened to the same extent, but are not regulated in regard to each other.

Figure 3:
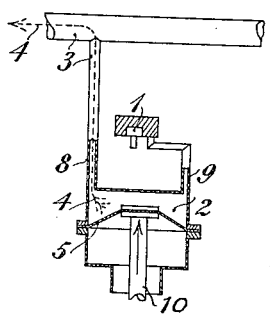
Figure 4:
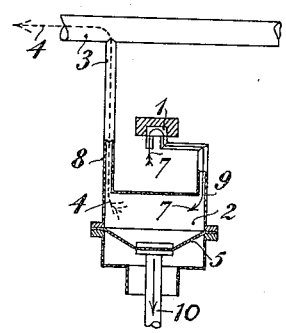
Figure 5:
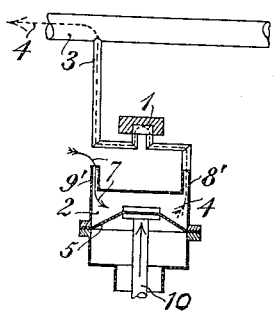
Figure 6:
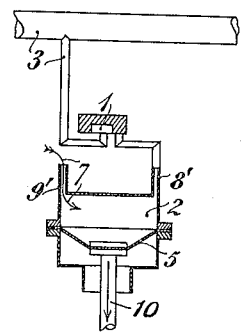

By the present invention the working is simplified, and the reliability and effectiveness are increased by the provision that one of the two working-agents (air of low, ordinary or high pressure) has constantly free access to the working-chamber, while only the access of the other working-agent is controlled, *i. e.* is established and broken off. In Figs. 3 and 4 the working-chamber 2 is in constant open connection with the suction-pipe 3, while for instance the air-passage is alternately closed and opened. In Figs. 5 and 6 the reverse is the case. In the one period, Fig. 3 (and 6), there is in the working-chamber 2 a pressure contingent upon the pressure of the non-shut off working-agent (and by the size of the access-opening or channel 8 or 9'). In the other period, Fig. 4 (and 5), we have this pressure plus or minus the pressure contingent upon the access of the other working-agent. When one working-agent for instance is a vacuum corresponding to a mercury-column of about 36 cm., the pressure in the working-chamber will in the first period, or at least toward its finish, be brought down almost to this pressure. The other working-agent is for instance the outer air whose pressure may be fixed at a mercury-column of say 76 cm. When this air is admitted to the working-chamber 2, Fig. 4, the pressure will increase, and by a suitable choice of the size of the access channel in relation to the size of the vacuum channel 8 it may easily be obtained that an effective pressure is produced during this period and sufficiently great, either by itself or in known manner assisted by the weight of the working member, to make this latter one perform a movement opposite that which it performed during the previous period. By regulating the opening of the duct or channel 8 or 9 which is accomplished by the slide-valve and the regulation of the stroke of the same, it becomes possible at will to make the movement in the one period, no matter which one, take place quicker than in the other one. Thus the working of the slide becomes more simple and more reliable. The function of the slide is merely the same as that of an ordinary cock or valve, and it may if desirable be sufficient to use such a cock or valve suitably actuated from the working-member or the pulsator-valve; or a slide of a suitable kind may be used which is only influenced by one of the working-agents.

I claim—

1. In a pneumatically-controlled milking-pulsator, the combination of a working-chamber, a diaphragm in said working-chamber connected with the controlling device of the teat-cups, a suction-pipe, pipes connecting the working-chamber with the suction-pipe and atmosphere respectively for giving access of two different pneumatic pressures to the working-chamber, and a controlling device for said pipe-connections by which one of the pipe-connections is regulated and the access of the pneumatic pressure-medium to the working-chamber is alternately interrupted while the access of the other pressure-medium is always left uninterrupted.

2. In a pneumatically-controlled milking-pulsator, the combination of a working-chamber, a diaphragm in said chamber, said diaphragm being connected with the controlling device of the teat-cups, a suction-pipe, a pipe connecting the working-chamber with the suction-pipe, a second pipe connecting the working-chamber with the atmosphere, and a controlling device for said pipe-connections for alternately subjecting the working-chamber to the action of the suction-pressure and the atmospheric pressure.

In testimony, that I claim the foregoing as my invention, I have signed my name in presence of two subscribing witnesses.

THOMAS THOMASSEN SABROE.

Witnesses:
P. HOFMAN BANG,
AXEL PERMIN.